Aug. 24, 1943.    R. L. PEAT    2,327,665
DIE CONSTRUCTION
Filed Nov. 21, 1941    2 Sheets-Sheet 1
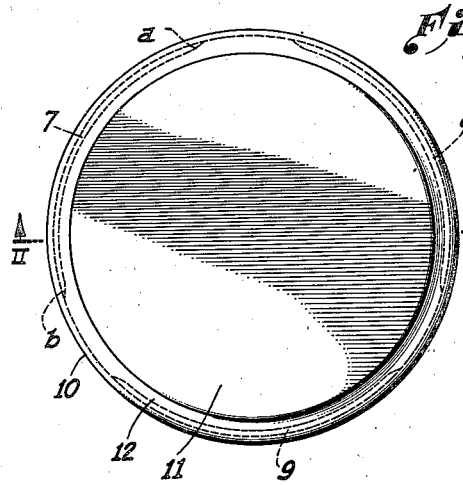
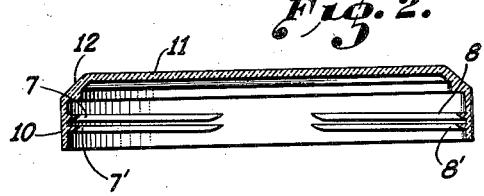
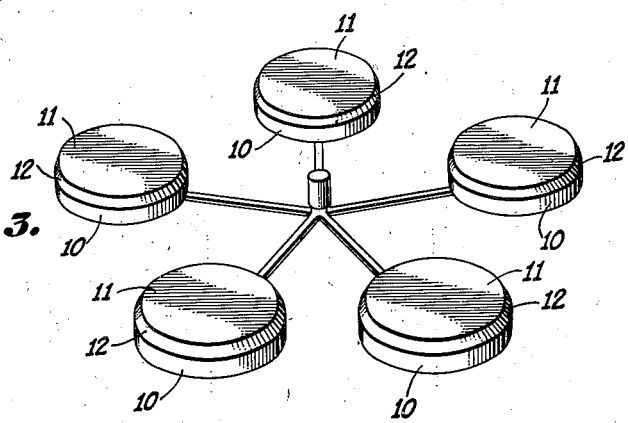
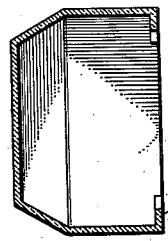
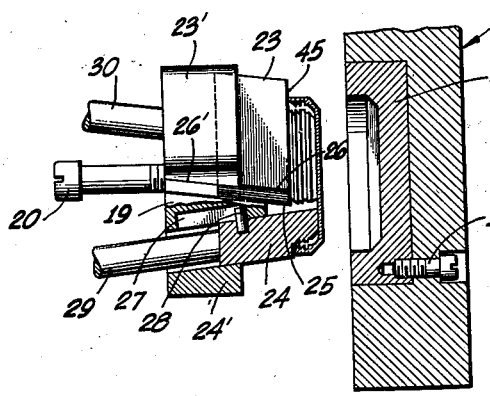
Roy L. Peat,
INVENTOR
BY
ATTORNEY.

Aug. 24, 1943.  R. L. PEAT  2,327,665
DIE CONSTRUCTION
Filed Nov. 21, 1941  2 Sheets-Sheet 2
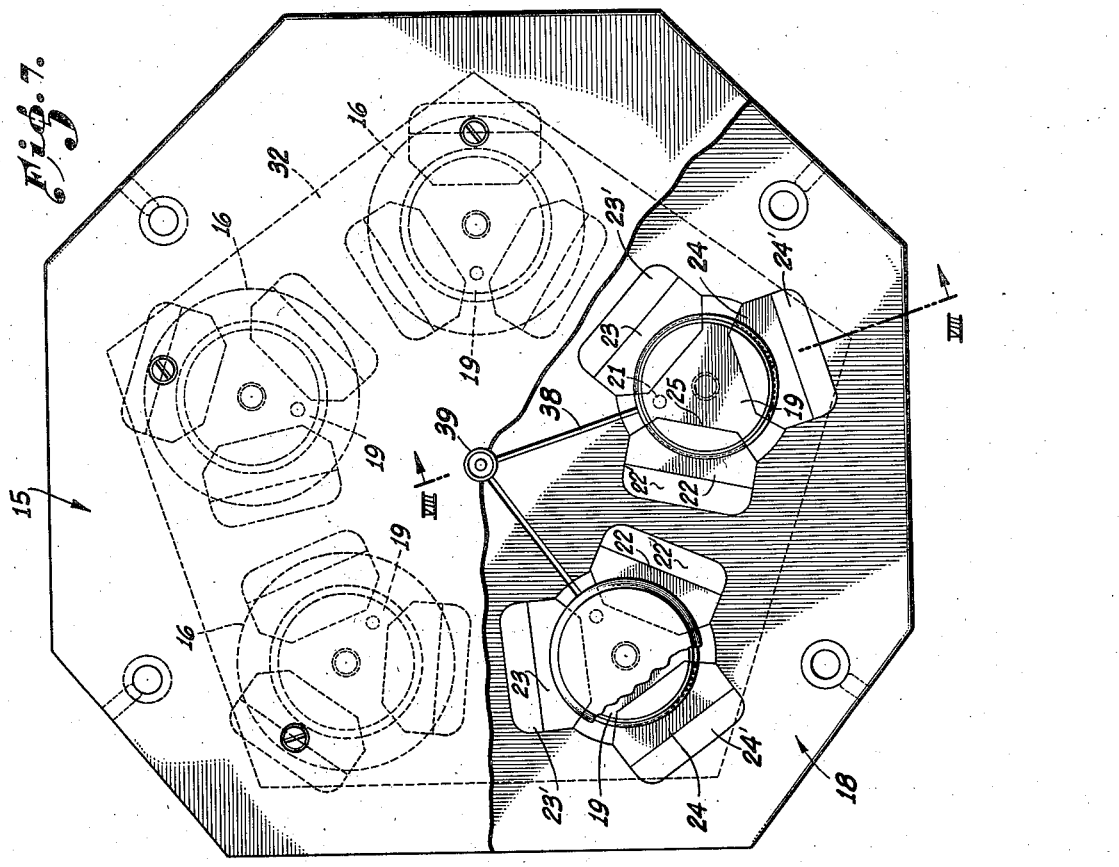
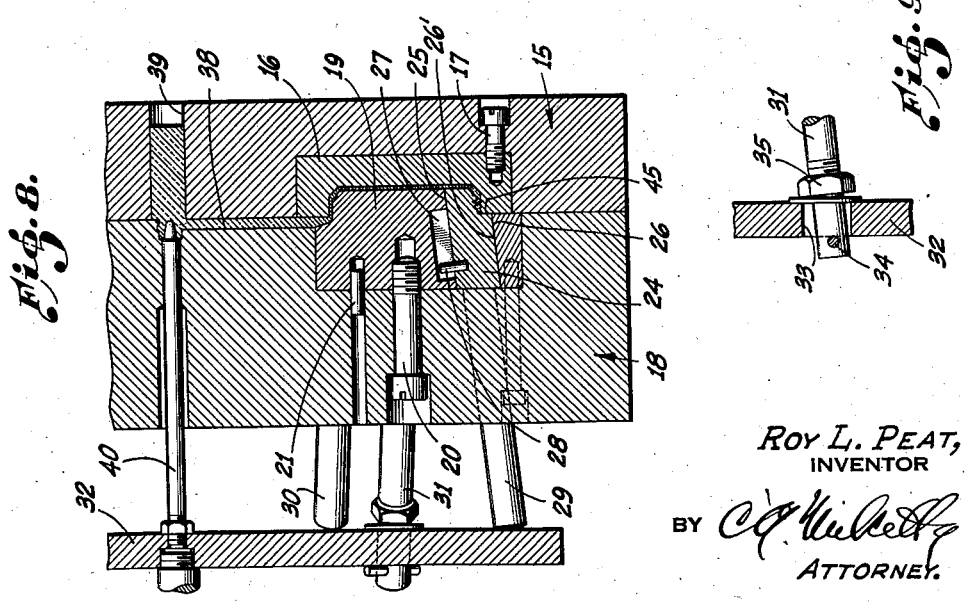
Roy L. Peat,
INVENTOR
BY
ATTORNEY.

Patented Aug. 24, 1943

2,327,665

UNITED STATES PATENT OFFICE 2,327,665

DIE CONSTRUCTION

Roy L. Peat, Los Angeles, Calif., assignor, by mesne assignments, to Max Factor & Co., Los Angeles, Calif., a corporation of Delaware Application November 21, 1941, Serial No. 419,926

2 Claims. (Cl. 18—42)

This invention pertains to an improved form of die or molding apparatus which permits the ready and facile manufacture of objects from thermosetting or thermoplastic compositions or metals, without secondary operations such as milling, grinding, thread-cutting or the like and without subjecting the object to deformation or stress during the step of stripping the object from the die.

The invention is particularly directed to a die construction or molding apparatus which permits the ready and facile manufacture of objects having inwardly extending flanges or elements or, differently stated, objects having one substantially closed end, cylindrical or polygonal sides and portions which extend inwardly from the sides into the space enclosed by the sides, such inwardly extending portions being spaced from the substantially closed end of the object.

Heretofore it has been thought virtually impossible to make objects (by die casting, pressure molding, injection molding or the like) when such objects have inwardly extending flanges or elements, particularly when the side walls or side portions of the object form an enclosed space into which these inwardly extending flanges extend. Container covers with internally extending threads have been made but such objects had to be rotated or spun off the male die. In some instances, longitudinal stripping has been attempted but such stripping must then take place while the composition is still deformable or soft, and imperfect objects are obtained.

The die construction of the present invention permits the ready and accurate manufacture of objects having internally extending members or portions, without removing the object from the male die by a spinning operation and without straining or deforming the objects. The die construction herein disclosed facilitates stripping and discharge of molded articles and is particularly well adapted for use in multiple dies of the character employed in injection molding. Straight line longitudinal removal of the molded articles from the dies is attained.

Generally stated, the present invention contemplates a molding apparatus including a female die and a cooperating male die, the male die being provided with a movable portion or portions instrumental in forming the inner surfaces of an object, the movable portion being adapted to move relative to the main body of the male die and toward the female die and its axis of movement, whereby the movable portion assists in stripping the molded object from the male die and detaches the movable portion from inwardly extending members formed in the object. The male die may be said to collapse during the discharge of the finished molded object.

The invention will be best understood by reference to the appended drawings which illustrate one form of the invention. It is to be understood, however, that the appended drawings are simply exemplary since the dies may change in shape and proportions with the shape, arrangement and construction of the molded object which is to be manufactured.

In the drawings:

Fig. 1 is a plan view of a container cover having inwardly extending members.

Fig. 2 is a transverse section of the container cover taken along the plane II—II of Fig. 1.

Fig. 3 is a perspective view of a set of five container covers joined by gates to a sprue, as discharged from an injection molding machine equipped with dies made in accordance with this invention.

Figs. 4 and 5 are transverse sections through two other objects having inwardly extending portions, which objects may be readily molded with the dies of this invention.

Fig. 6 shows the position of the die elements when the molded object is ready for discharge.

Fig. 7 is a front or plan view of a complete five cavity die adapted to make the container covers illustrated in Figs. 1 and 2.

Fig. 8 is a section taken along the plane VIII—VIII of Fig. 7 showing the male and female dies in position during a molding operation.

Fig. 9 is an enlarged view showing the connection between a guide rod and an actuating plate.

As heretofore stated, the die construction of this invention is particularly adapted to the manufacture of articles having inwardly extending portions or members. The container cover illustrated in Figs. 1 and 2 has cylindrical sides indicated at 10, and a closed end which forms the top 11. An inclined outer surface 12 connects the cylinder side with the top. It was desired to make a cover of this form with an inwardly extending thread capable of engaging a thread on the lip of a jar. This internally extending thread may be formed in interrupted form. As shown in the drawings, an inwardly extending interrupted thread is shown at 7, 8 and 9, each section having one or more threads, Fig. 2 illustrating two threads 7 and 7' and 8 and 8'. It is to be noted, moreover, that the length of each inwardly extending thread section as, for example, the length of the thread 7 between the points a and b, is materially greater than the unthreaded space between threaded sections 7 and 8.

A complete five cavity die for making the container covers herein described is shown in Figs. 6 to 9 inclusive. The drawings do ont illustrate the entire machine since injection molding machines, die casting machines and the like are well known. A female body portion is indicated at 15 and contains the female dies 16 adapted to form the outer surfaces 10, 11 and 12 of the container. Each of the female dies 16 may be held within the body portion 15 by one or more machine screws 17.

The male die block 18 contains the male dies adapted to cooperate with the female dies. Each of the male dies comprises a stationary male die body portion 19 held in position within the die block as by means of a bolt 20. A centering or registry pin 21 may also be employed for the purpose of properly positioning the stationary body portion of the male die 19 within the die block. Each of the male dies also includes three movable male die portions such as 22, 23 and 24. By referring to Fig. 7, it will be seen that the movable portion 24 is adapted to form the inwardly extending threads of the container cover. It also cooperates with a stationary portion 19 in forming the inner surfaces of the container cover.

The movable portion 24 fits into the stationary body portion 19 and is arranged for movement along inclined sides 25 and 26, these inclined sides being directed toward the axis of movement of the female die 16 and toward such female die. Filler blocks (22', 23', 24') are fitted exteriorly of each of the movable portions 22—24 of the male die for the purpose of providing suitable inclined faces (such as 26') against which the movable die portion may move and in order to facilitate assembly. Each of the filler blocks may be held in place in the die block by one or more bolts or machine screws.

Stop means are provided for limiting the movement of the movable portion 24 with respect to the stationary portion 19 and such means may comprise a slot or groove 27 formed in the stationary portion 19 and a pin 28 carried by the movable portion 24 and extending into said slot.

The movable portion 24 may also be provided with a guide rod or guide rods connected to the bottom of the movable member 24 and extending through passageways formed in the die block 18; in the form of apparatus illustrated, two guide rods are connected to each of the movable portions of the male die. One of such guide members 29 is shown attached to movable portion 24 in Fig. 8. Guide members 30 and 31 are attached to the movable portion 24. These guiding members 29 and 30 may either bear against the actuating plate 32 or as shown in connection with guide rod 31, may extend through a slot 33 formed in the actuating plate 32 (see Fig. 9) and may be pinned to such plate as by means of a pin 34 and a nut and washer 35.

When guide rods of the type shown at 31 are employed, the pin 34 and the nut 35 constitute means for limiting the movement of the movable die portion with respect to the stationary portion 19.

A suitable gate 39 leads from a central injection point to each of the mold assemblies. A conduit 38 may be formed in the female body portion 15 through which thermoplastic material or other molding composition may be introduced under suitable temperature and pressure conditions. The element 40 shown extending into the port hole at the junction of the various gates constitutes an adjustable valving or obdurating element and facilitates the ejection of five complete articles or container covers joined by narrow strips or gates to a central residual mass, as shown in Fig. 3.

Fig. 8 shows the elements of the die in closed position ready for molding, or during the molding or injection operation. In Fig. 6 the elements are shown in the discharging position, the female dies having been withdrawn and the movable portions of the male die 22, 23 and 24 having moved outwardly toward the female die and its axis of movement. It will be seen that by reason of the inclination of the sides 25 and 26 of the movable die portion 24, this male die portion has not only caused the article to be stripped off the stationary male die 19 but in addition has moved inwardly away from the inwardly extending threads formed on the inner surfaces of the sides of the container top, thereby causing the container to be automatically liberated from the male die. In actual practice the die herein described and illustrated is self-discharging in character.

It is to be understood that although three movable portions 22, 23 and 24 have been shown, the invention is not limited thereto. In some instances, two movable portions are sufficient. For example, Fig. 5 illustrates a cross section of a cover which is rectangular in plan view. The inner surfaces of this cover are provided with inwardly extending flanges 40 and 41 at its two ends. The male die for making an article of this character would only require two movable male die portions. Fig. 4 illustrates a form of cap where the inwardly extending flange 42 is positioned at the edge or bottom of the cap. Figs. 4 and 5 simply indicate some of the varieties of articles which may be made by employing the die construction embraced by this invention.

Those skilled in the art will readily appreciate that the movements of the die blocks toward and away from each other and the actuation of the movable die portions of the male dies must be in timed relation and in accordance with the injection molding or die casting schedule established for the particular composition being employed. Attention may be called to the fact that the movable portion 24 of the male die is provided with a shoulder 45 adapted to come in direct contact with a portion of the female die 16 so that when the die blocks 15 and 18 are brought together, such direct contact will cause the movable portion 24 to be brought back into proper position. In addition, centering or registry pins may be carried by one of the die blocks and cooperate with the opposing die block for assuring proper registry. Springs may surround some of the guide rods 29, 30 and 31 for the purpose of facilitating the movement of the movable portions of the male die.

Numerous changes, modifications, variations and adaptations of the present invention will occur to those skilled in the art. All changes coming within the scope of the appended claims are embraced thereby.

I claim:

1. In a moulding apparatus adapted to form container covers having inwardly extending threads, the combination of: a female die adapted to form the outer surfaces of the container cover; a male die block provided with a collapsible male die adapted to form the inner surfaces of the container cover, said collapsible male die comprising a cylindrical, stationary, central body portion, three substantially axial recesses formed in the walls of the body portion, each of said recesses including a pair of side walls radial with respect to the body portion, and a bottom wall in a plane inclined toward the axis and top of the body portion; a guiding slot in the die block opposite each of said recesses, said slot having a wall parallel to and facing the bottom of the opposing recess; and a movable male die portion slidably positioned in each of said recesses, said movable portion extending into and in slidable contact with the wall of an opposing guide slot, whereby said movable portions may be simultaneously moved along said inclined bottom walls of said recesses and opposing walls of the guiding slots to strip a container cover from said male die and to disengage said movable portions from inwardly extending threads formed on the container cover, to permit said container to be removed without deformation.

2. In an apparatus of the character defined in claim 1, the provision of a slidable connection between the central body portion and each of said movable male die portions for limiting the movement of the movable portions with respect to the central body portion.

ROY L. PEAT.